(12) United States Patent
Graefe

(10) Patent No.: US 8,108,400 B2
(45) Date of Patent: Jan. 31, 2012

(54) DATABASE SEGMENT SEARCHING

(75) Inventor: Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 291 days.

(21) Appl. No.: 12/493,189

(22) Filed: Jun. 27, 2009

(65) Prior Publication Data

US 2010/0332457 A1    Dec. 30, 2010

(51) Int. Cl.
*G06F 7/00*    (2006.01)
(52) U.S. Cl. ......... 707/741; 707/755; 711/112; 711/213
(58) Field of Classification Search ................. 707/705, 707/706, 712, 732, 745, 754, 741, 755; 711/112, 711/213
See application file for complete search history.

(56) References Cited

U.S. PATENT DOCUMENTS

| | | | |
|---|---|---|---|
| 6,049,804 A * | 4/2000 | Burgess et al. ........................ | 1/1 |
| 6,973,452 B2 | 12/2005 | Metzger et al. | |
| 2004/0249857 A1* | 12/2004 | Gauweiler ................. | 707/104.1 |
| 2008/0183767 A1* | 7/2008 | Zhu et al. ..................... | 707/200 |

OTHER PUBLICATIONS

A. Ailamaki et al., "Weaving relations for cache performance," VLDB year 2001.
P. Bumbulis et al., "A compact B-tree," SIGMOD year 2002.
R. Bayer et al., "Organization and maintenance of large ordered indexes," SIGFIDET Workshop, year 1972.
G. Graefe, "Sorting and indexing with partitioned B-trees," CIDR year 2003.
G. Graefe, "B-tree indexes, interpolation search, and skew," DaMoN, year 2006.
A. Gartner et al., "Efficient bulk deletes in relational databases," ICDE, year 2001.
G. Graefe et al., "B-tree indexes and CPU caches," ICDE year 2001.
D. Lomet et al., "The evolution of effective B-tree page organization and techniques: A personal account," SIGMOD Record, year 2001.
T. Lehman et al., "A study of index structures for main memory database management systems," VLDB year 1986.
H. Leslie et al., "Efficient search of multi-dimensional B-trees," VLDB, year 1995.
G. Moerkotte, "Small materialized aggregates: A light weight index structure for data warehousing," VLDB year 1998.
J. Rao et al., "Making B+-tree cache conscious in main memory," SIGMOD year 2000.

* cited by examiner

*Primary Examiner* — Amy Ng

(57) ABSTRACT

A segment encompasses a number of segment records less than the total number of records of a database. The segment records have values for a field of the database. Lowest and highest values of the segment records for the field, and a bitmap for the segment, can be determined and stored. Selected bits of the bitmap each correspond to a value for the field. Each selected bit is set to one where at least one segment record has the value to which the bit corresponds. An index relating to just the segment records can be determined and stored. The lowest and highest values, and the bitmap, are adapted to permit determination of whether the segment has to be loaded into memory to locate records that satisfy a query. The index is adapted to permit searching of the segment records after the segment has been loaded into the memory.

13 Claims, 5 Drawing Sheets

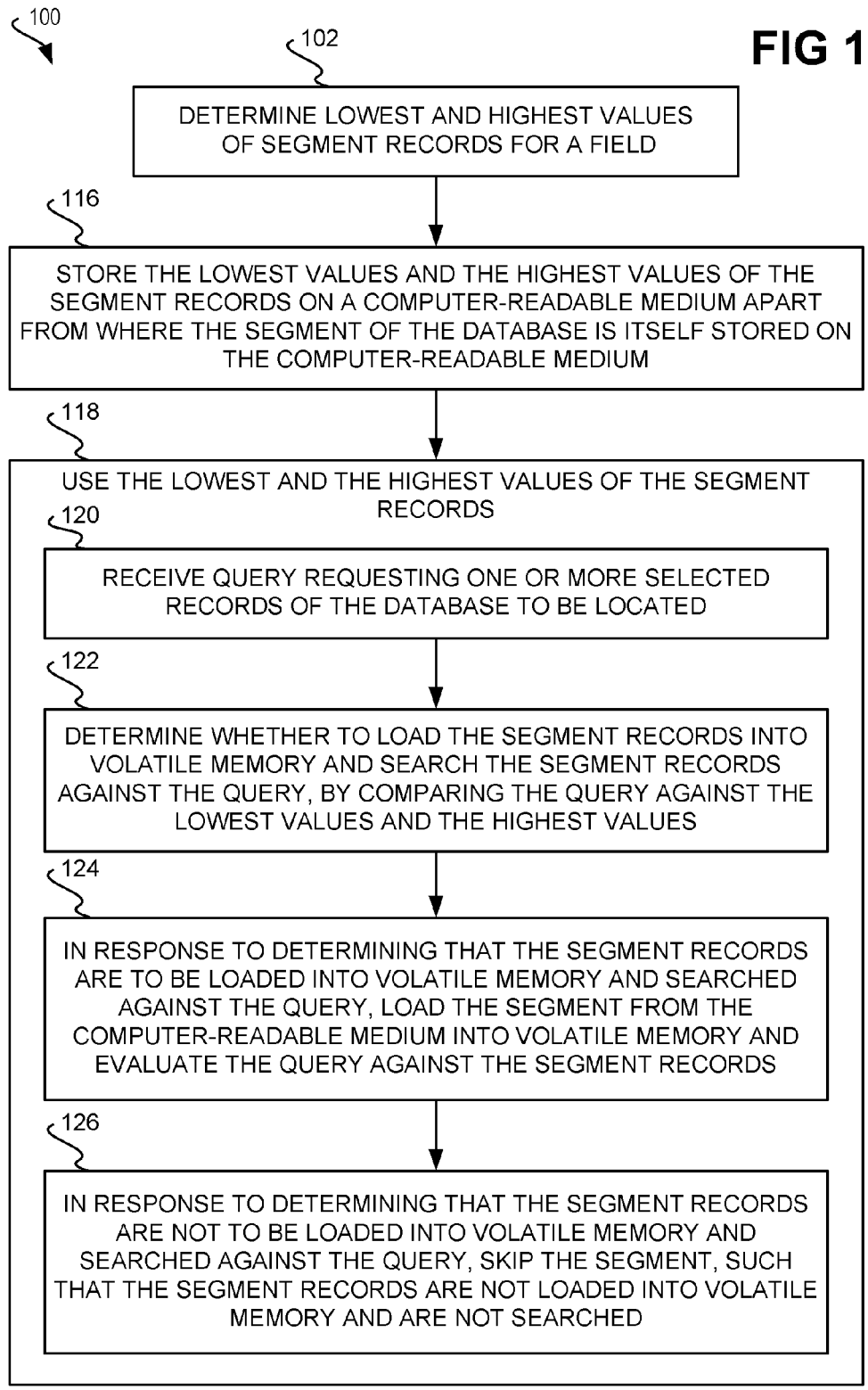

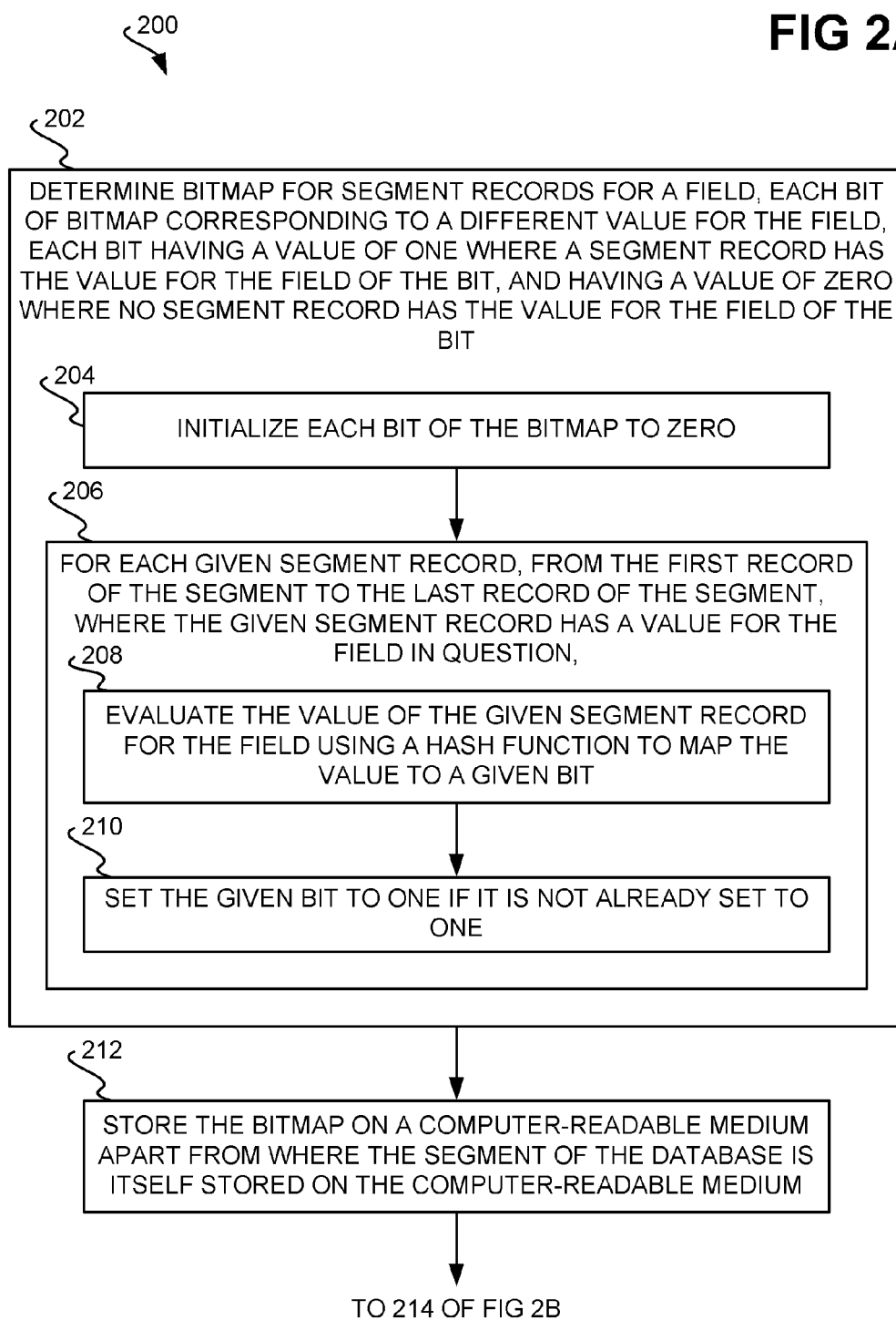

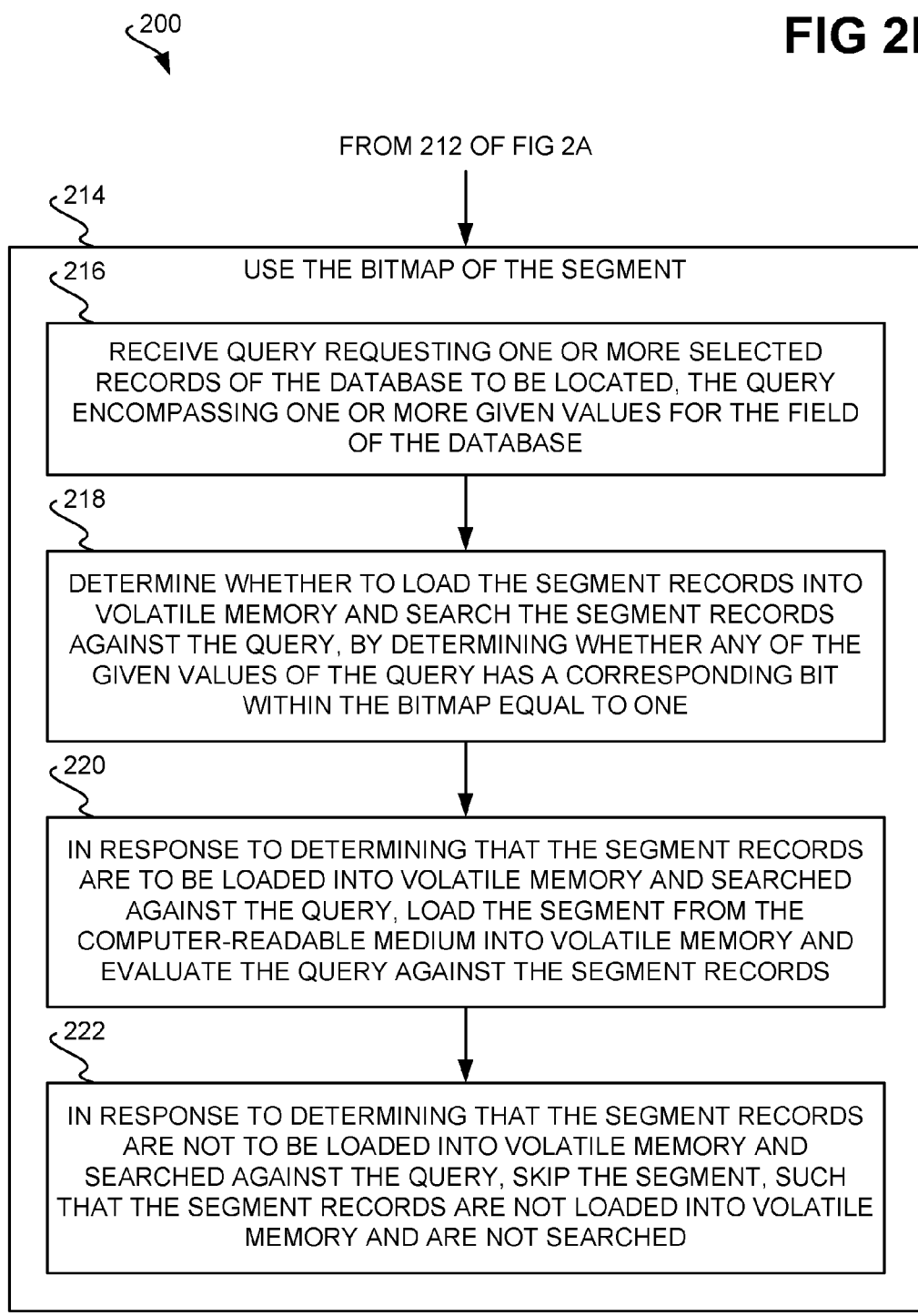

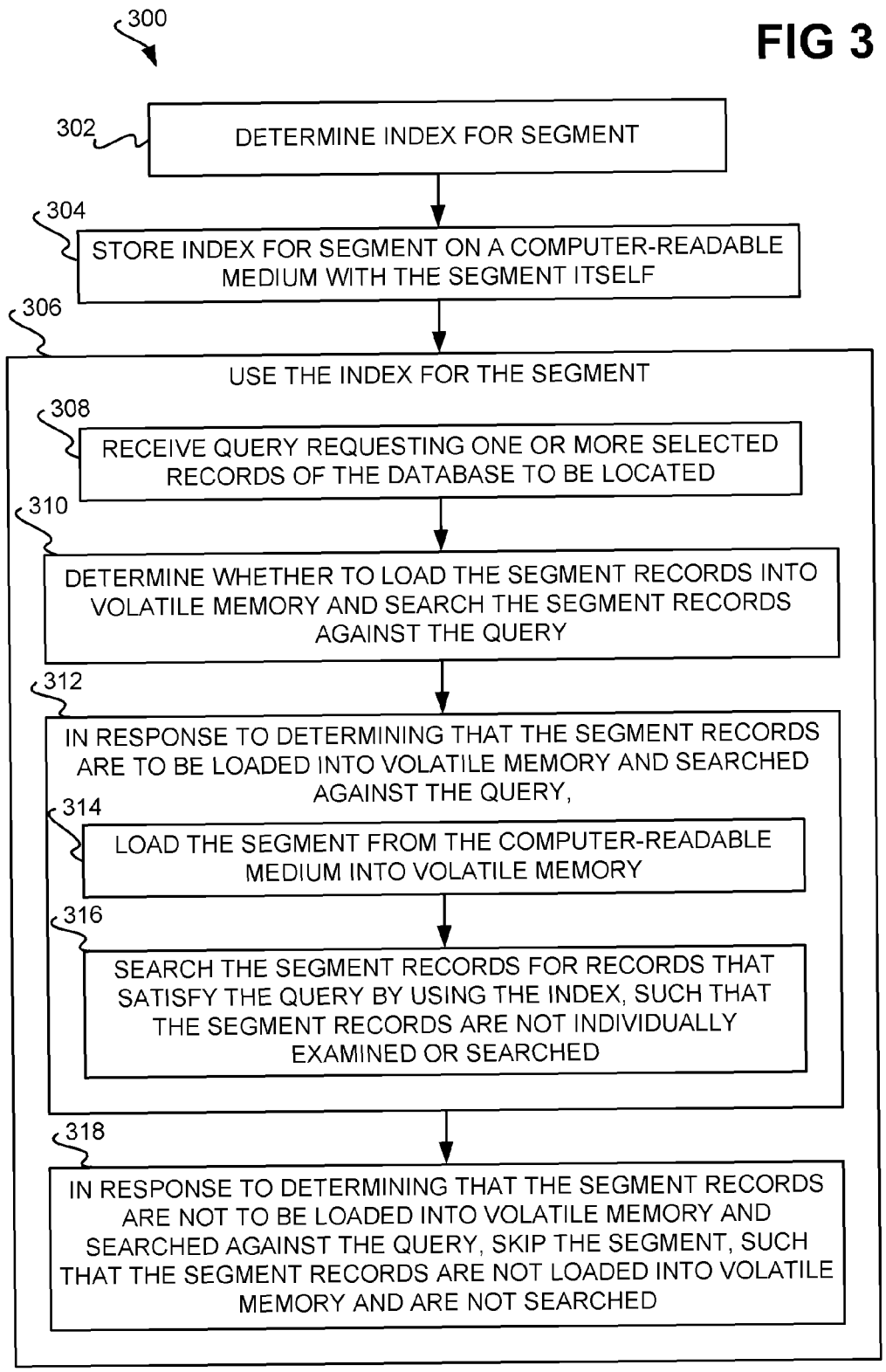

DATABASE SEGMENT SEARCHING

BACKGROUND

A database is a structured collection of data stored within a computing system. A database may be considered as having a number of records, where each record may have a value for each of a number of different fields. For instance, a relational database may be considered as being organized as a grid with multiple rows and one or more columns. Each row typically corresponds to a record, and each column typically corresponds to a field.

As a representative example, a database may store information regarding a number of different people. Each record of the database corresponds to a different person. There may be fields of the database corresponding to first name, last name, street address, city, state, zip code, and phone number. Thus, a given record has values corresponding to the fields. For example, a given record may have the values "John," "Smith," "1210 Main St," "New York," "N.Y.," "10027," and "212-555-1234" for the database fields.

BRIEF DESCRIPTION OF THE DRAWINGS

FIG. 1 is a flowchart of a method for using lowest and highest values of segment records for a field of a database, according to an embodiment of the present disclosure.

FIGS. 2A and 2B are flowcharts of a method for using a bitmap for a segment for a field of a database, according to an embodiment of the present disclosure.

FIG. 3 is a flowchart of a method for using an index for a segment, according to an embodiment of the present disclosure.

DETAILED DESCRIPTION

Overview of Problem and Solution

Figure 4:
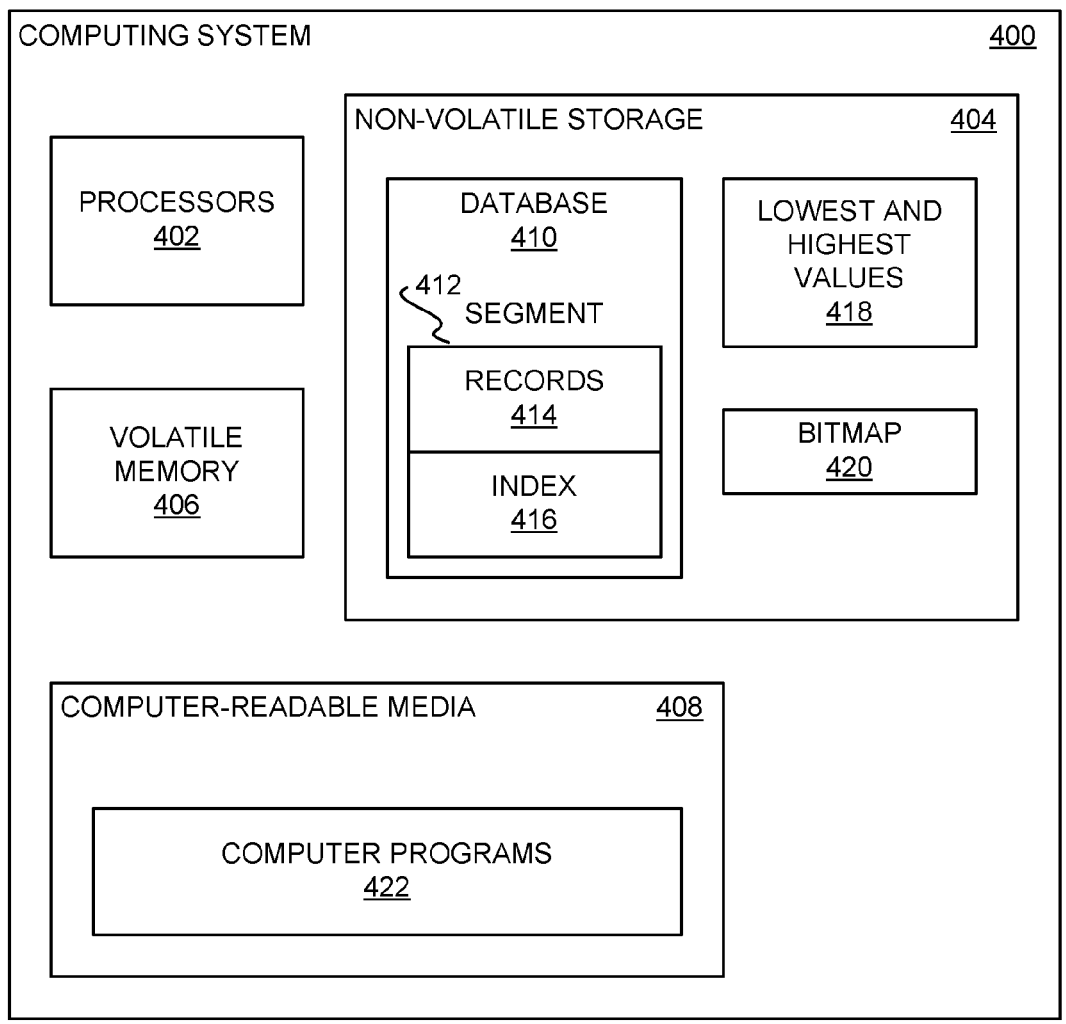
FIG. 4 is a diagram of a representative computing system, according to an embodiment of the present disclosure.

As noted in the background section, a database is a structured collection of data that includes a number of records, where each record may have a value for each of a number of different fields. The records correspond typically to rows of the database, and the fields typically correspond to columns of the database. Databases can become very large with the addition of data into them. For example, it is not uncommon to have a database with billions of records, or more.

To locate desired data within a database, a query is formulated and the database is searched against the query. A query may request all the records that have a certain value for a given field and that have a value within a certain range of values for another field, for instance. As the size of a database increases—that is, as the number of records stored within the database increases—searching the database pursuant to queries becomes more time consuming. In at least some respects, database performance can be measured by how quickly records from the database are returned in response to queries.

A database is commonly stored on a non-volatile storage, or computer-readable medium, like a hard disk drive. When a query is to be evaluated against the database, portions of the database may be successively loaded from this non-volatile storage into volatile memory, such as volatile semiconductor memory like dynamic random-access memory, to evaluate the query against each such portion of the database. The guiding principle here is that it is quicker to evaluate the query against a given portion of the database while the portion is stored in volatile memory, which is accessed more quickly than non-volatile storage, than to evaluate the query against the given portion of the database while the portion is stored in non-volatile store.

A database may be divided into a number of segments, where each segment encompasses some but not all of the records of the database. A segment is a general term, and encompasses what are sometimes referred to as zones, as well as what are commonly referred to as partitions. A zone is a portion of the records of the database that are stored on a particular area, such as typically a contiguous area, of non-volatile storage. For example, each zone may have a predetermined size. When new records are being added to a database, they may be stored in a given zone until the zone is full, such that a new zone is created and additional records are stored in the new zone, and so on. By comparison, a partition is a portion of the records of the database that all satisfy certain conditions, such as, for instance, all the records that have a certain value for a given field.

Embodiments of the present disclosure provide for faster evaluation of queries against databases that are divided into segments. In certain embodiments, the present disclosure determines whether a given segment should be loaded into volatile memory from non-volatile storage in order to locate records of the database that satisfy a given query. For instance, if it can be determined a priori that a given segment does not contain any records that satisfy a given query, then this segment can be skipped during evaluation of the query, and does not have to loaded into volatile memory to locate database records that satisfy the query. In this respect, query evaluation against the database is performed more quickly, because segments that do not contain any records that satisfy a query are not loaded into volatile memory and searched. Particularly, one embodiment uses multiple lowest values and highest values of the records of a segment, and/or a bitmap for the segment, to determine whether the segment should be loaded into memory and searched in comparison to a query, as is described in detail below.

In certain other embodiments, the present disclosure provides for faster searching of a given segment that has been loaded into volatile memory in order to locate records that satisfy a given query, without having to examine record-by-record all the records encompassed by the segment in question. For instance, once a given segment has been loaded into volatile memory, each record of the segment may have to be examined to determine whether it satisfies the query. By comparison, certain embodiments of the disclosure permit searching the segment for records that satisfy the query without having to examine each record of the segment. In this respect, query evaluation is again performed more quickly, because the records of a segment loaded into memory do not have to be individually examined to locate the records that satisfy the query. Particularly, one embodiment uses an index for just the records of a segment to determine whether any of the records of the segment satisfy the query, as is described in detail below.

Lowest Values and Highest Values of a Segment for a Field

This section of the detailed description describes how the lowest values and the highest values of the records of a segment of a database for a field of the database can be used. In particular, the lowest and the highest values of a segment can be used to determine whether the segment should be loaded into memory to locate database records that satisfy a particular query. Segment records are records of a given segment of a database, whereas database records are records of the database. In this respect, segment records are also database records.

In general, there are m>1 lowest values and n>1 highest values for the records of a segment of a database for a field. For example, the field may be a numeric field, such as the number of errors that have occurred. If m=2 and n=2, and if there are ten segment records having the values for this field of 0, 3, 4, 5, 5, 6, 6, 6, 7, and 10, then the two lowest values are 0 and 3, and the two highest values are 7 and 10. The remainder of this section of the detailed description uses this example to explain specifically how lowest values and highest values are determined and used.

FIG. 1 shows a method 100 for using lowest and highest values of the records of a segment of a database for a field of the database, according to an embodiment of the disclosure. The parts of the method 100, as well as parts of other methods of embodiments of the disclosure, may be performed by a processor of a computing device executing a computer program that is stored on a computer-readable medium. Such a computer-readable medium may be a hard disk drive, a semiconductor memory, or another type of computer-readable medium. As such, the methods of embodiments of the disclosure can be implemented as computer programs stored on computer-readable media, such that execution of the computer programs by a processor of a computing device results in performance of the methods.

The lowest values and the highest values of the records of a segment of a database for a field of the database are determined (102), which can be achieved in any of a number of customary or different ways. The lowest values and the highest values of the segment records for the field that have been determined are then stored (116). In one embodiment, the lowest and highest values are stored on a non-volatile storage, or computer-readable medium, apart from where the segment records of the segment of the database are themselves stored on this non-volatile storage or computer-readable medium. The underlying principle here is that the lowest and the highest values for each database segment are able to be loaded into volatile memory that is quicker to access than such non-volatile storage, and may remain within the volatile memory during the entire time the database is being used, without also having to load any of the database segments into such memory.

The lowest and the highest values of the segment records are then used to determine whether the segment of which the segment records are a part is to be loaded into memory to evaluate a query against the database as a whole to locate one or more selected records that satisfy the query (118). Thus, the query requesting one or more selected records of the database to be located is received (120). The query may request records with a given field that have a specified range (or multiple ranges) or that are equal to a specified value.

Three example queries are described in the remainder of this section of the detailed description. The first example query is to return all records within the database having values for the field in question between 3 and 8. The second example query is to return all records within the database having values for the field between 1 and 2. The third example query is to return all records within the database having values for the field between 8 and 9.

It is determined whether to load the segment records of the segment into volatile memory, and then to search the segment records against the query, by comparing the query against the lowest values and the highest values for the segment records that have been determined (122). Note again that in the example the two lowest values are 0 and 3, and the two highest values are 7 and 10. As to the first example query, which requests records having values between 3 and 8, comparing the query against the lowest and highest values results in the conclusion being drawn that there are segment records within the segment that satisfy the query. This is because one of the lowest values is 3, which means that at least one segment record has a value between 3 and 8 as specified by the query. This is also because one of the highest values is 7, which also means that at least one segment record has a value between 3 and 8 as specified by the query.

As to the second example query, which requests records having values between 1 and 2, comparing the query against the lowest and highest values results in the conclusion being drawn that there are no segment records within the segment that satisfy the query. This is because the lowest values are 0 and 3, such that there cannot be any segment records having values between 1 and 2, since if there were, one of the lowest values would be 1 or 2, instead of 3. Similarly, as to the third example query, which requests records having values between 8 and 9, comparing the query against the lowest and highest values results in the conclusion being drawn that there are no segment records within the segment that satisfy the query. This is because the highest values are 7 and 10, such that there cannot be any segment records having values between 8 and 9, since if there were, one of the highest values would be 8 and 9, instead of 7.

Note in this respect that having multiple lowest values, where m>1, and multiple highest values, where n>1, is advantageous as compared to having just one lowest value, where m=1, and just one highest value, where n=1. This is because having multiple lowest and highest values permits the comparison made in part 108 to be more robust. That is, this is at least in part because the highest lowest and highest values may take into account outlier values of the segment records for the field in question.

For example, if there were just one lowest value and just one highest value, then the lowest value would be 0 and the highest value would be 10. As such, as to the second example query requesting records having values between 1 and 2, it would be concluded that the segment would have to be loaded into memory and the segment records searched, because the range [1, 2] of the query falls within the range [0, 10] specified by the singular lowest value and the singular highest value. By comparison, having two lowest values permits the conclusion being drawn that there are no segment records that fall within the range [1, 2] of the query, because the first lowest value is 0 and the second lowest value is 3. In general, increasing the number of lowest values increases the specificity by which minimal value outliers within the segment records can be distinguished.

If it is determined that the segment records are to be loaded into volatile memory and searched against the query in part 122, then in response the segment is loaded into volatile memory and the query is evaluated against the segment records (124). The segment is loaded into volatile memory from the non-volatile storage or computer-readable medium, so that the segment records are more quickly searched, in the typical scenario in which volatile memory is quicker to access than non-volatile storage. Loading the segment into such memory thus loads all the segment records into the memory, such that at any given time (i.e., simultaneously), all the segment records are stored within the volatile memory.

The segment can then be searched for segment records that satisfy the query. In this respect, the segment records are said to be loaded into memory to at least partially locate the records of the database that satisfy the query, in that the records of the particular segment in question that satisfy the query are located. As to the first example query noted above, part 124 is performed because it has been determined in part 122 that the segment records are to be loaded into memory and searched (i.e., evaluated) against the query. However, as to the second and third example queries noted above, part 124 is not performed, because it has been determined in part 122 that the segment records are not to be loaded into memory and searched (i.e., evaluated) against the query.

By comparison, then, if it is determined that the segment records are not to be loaded into volatile memory and searched against the query in part 122, then in response, the segment in question is skipped (126), such that the segment and the segment records are not loaded into volatile memory and are not searched. As to the first example query noted above, part 126 is not performed, because it has been determined in part 122 that the segment records are to be loaded into memory and searched against the query. However, as to the second and third example queries noted above, part 126 is performed because it has been determined in part 122 that the segment records are not to be loaded into memory and searched against the query.

Part 126 thus effects quicker searching of a database against a query. This is because all the segment records of a given segment may be able to be discounted as not having any segment records that satisfy the query, without having to load the segment into memory, and without having to examine any of the segment records to determine whether they satisfy the query. For example, if there are ten segments, and nine of the ten segments do not have to be searched for segment records that satisfy a query, evaluation of the query may be considered in some respects as occurring 90% faster than if all ten segments have to be searched.

Bitmap for a Segment for a Field

This section of the detailed description describes how a bitmap for the records of a segment of a database for a field of the database can be used. In particular, the bitmap has a number of bits. At least some of the bits may correspond to the different values that records of the database can take on for the field. Each of these bits corresponds to one or more different values. If any of the segment records of a segment have a value to which a given bit corresponds, then the given bit is set to one. If none of the segment records of a segment have a value to which the given bit corresponds, then the given bit is set to zero.

The remainder of this section of the detailed description uses the same example of segment records of a segment that was presented in the previous section, to explain specifically how the bitmap is determined and used. In this example, there are ten segment records having the values for the field in question of 0, 3, 4, 5, 5, 6, 6, 6, 7, and 10. The field is thus a numeric field. The different values that a database record can take on for this field in this example are numbers between 0 and 10.

FIGS. 2A and 2B show a method 200 for using a bitmap for a segment of a database for a field of the database, according to an embodiment of the disclosure. The bitmap for the segment—that is, for the segment records of the segment—is determined (202). As noted above, at least some of the bits correspond to different values for the field. Each such bit has a value of one where a segment record of the segment in question has a value for the field to which this bit corresponds, and has a value of zero where no segment record of this segment has a value for the field to which this bit corresponds.

The bits of the bitmap are each initialized to zero (204). Thereafter, the following is performed for each given segment record, from the first record of the segment to the last record of the segment (206), specifically where the given segment record has a value for the field in question. It is noted in this respect that not all the segment records may have a value for the field. The segment records that do not have values for the field are not examined in part 206.

The value of the given segment record for the field is evaluated using a hash function to map the value to a given bit (208). A hash function may in one embodiment map values for the field to a bit of the bitmap one-to-one and/or many-to-one. On a one-to-one basis, each different value for the field is mapped to just one bit of the bitmap, and each bit has just one value mapped to it. On a many-to-one basis, each different value for the field is again mapped to just one bit of the bitmap, but each bit can have more than one value mapped to it. The given bit to which the value of the given segment record for the field has been mapped is then set to one if has not already been set to one (210).

As an example, the hash function may map the values between 0 and 10 to six different bits. The values 0, 4, 8, and 9 may be mapped to the first, second, third, and fourth bits, respectively. The values 1-3 may be mapped to the fifth bit, whereas the values 5-7 and 10 may be mapped to the sixth bit. Therefore, for the ten segment records in the example that have the values 0, 3, 4, 5, 5, 6, 6, 6, 7, and 10, the bits that are set to one are the first, second, fifth, and sixth bits. This is because the first, second, fifth, and sixth bits correspond to values that at least one of the segment records have for the field, and the third and fourth bits correspond to values that none of the segment records have for the field.

It is noted that determining the bitmap in part 202 may be achieved in manners other than that which has been described with reference to parts 204, 206, 208, and 210. The bitmap may be determined (or updated) in part 202 at the time that new records are being loaded into the database in new or existing database segments, in one embodiment. It is further noted that while part 202 has been described in relation to a particular field of the database and to a given segment of the database, it may be performed in relation to each field of the database and to each segment of the database.

Finally, it is explicitly noted that while some of the bits of the bitmap may correspond to just one different value of a field of the database, other bits of the bitmap can each correspond to one or more different ranges of values (i.e., more than one different value) of the field of the database. In the example presented above, while the first, second, third, and fourth bits each just have one value mapped to it, particularly the values 0, 4, 8, and 9, respectively, the fifth and sixth bits each have more than one value mapped to it. In particular, the range of values 1-3 is mapped to the fifth bit, and the range of values 5-7 as well the value 10 are mapped to the sixth bit. A given value may further be mapped to more than one bit of the bitmap in some embodiments.

The bitmap is then stored (212). In one embodiment, the bitmap, like the lowest and highest values described above, is stored on a non-volatile storage, or computer-readable medium, apart from where the segment records of the segment of the database are themselves stored on this non-volatile storage or computer-readable medium. The underlying principle here is again that the bitmap for each database segment is able to be quickly loaded into volatile memory that is quicker to access than such non-volatile storage, and may remain within the volatile memory during the entire time the database is being used, without also having to load any of the database segments into such memory.

The bitmap for the segment is then used to determine whether the segment of which the segment records are a part is to be loaded into memory to evaluate a query against the database as a whole to locate one or more selected records that satisfy the query (214). Thus, the query requesting one or more selected records of the database to be located is received (216). The query may request records with a given field that have a specified range (or multiple ranges) or that are equal to a specified value. For instance, the query encompasses one or more given values for the field of the database. Three example queries are described in the remainder of this section of the detailed description. The first example query is to return all records within the database having the values for the field in question between 1 and 3. The second example query is to return all records within the database having a value for the field equal to 8. The third example query is to return all records within the database having values for the field between 5 and 7.

It is determined whether to load the segment records of the segment into volatile memory, and then to search the segment records against the query, by determining whether any of the given values encompassed by the query has a corresponding bit within the bitmap equal to one (218). Note again that in the example there are six bits corresponding to the values 0; 4; 8; 9; 1-3; and 5-7, 10, respectively, where the first, second, fifth, and sixth bits have been set to one. As to the first example query, which requests records having values between 1 and 3, this query perfectly corresponds to the fifth bit, since just the values between 1 and 3 are mapped to the fifth bit. Because the fifth bit is equal to one, the conclusion is drawn that there are segment records within the segment that satisfy this query.

As to the second example query, which requests records having a value equal to 8, this query perfectly corresponds to the third bit, since just the value 8 is mapped to the third bit. Because the third bit is not equal to one, the conclusion is drawn that there are no segment records within the segment that satisfy this query. As to the third example query, which requests records having values between 5 and 7, this query imperfectly corresponds to the sixth bit, since the value 10, in addition to the values between 5 and 7, are mapped to the sixth bit. Because the sixth bit is equal to one, the conclusion is drawn that there may, but not necessarily that there are, segment records within the segment that satisfy this query. For example, the sixth bit may have been set to one because there is a segment record having the value 10, where there are no segment records having the value 5, 6, or 7. As such, the sixth bit is set equal to one, and therefore the segment will be loaded into memory and searched for segment records corresponding to the query requesting records having values between 5 and 7, even though it is not known just on the basis of the sixth bit being equal to one whether there are any such records.

Note in this respect that such a bitmap is advantageous because it permits decisions to be made as to whether a given segment should be loaded into memory and searched for records that satisfy a given query. As to the three example queries noted above, the bitmap provides a definitive answer for the first and the second queries. That is, the bitmap can guarantee that there are segment records that may satisfy the first query, such that the segment should be loaded into memory and searched to evaluate the first query. The bitmap can also guarantee that there are no segment records that satisfy the second query, such that the segment should not be loaded into memory and searched to evaluate the second query.

While the bitmap does not provide a definitive answer for the third query, in that the bitmap cannot guarantee that there are or that there are not segment records that satisfy the third record, insofar as the bitmap provides definitive answers for the first two queries, it is nevertheless useful. Furthermore, a different type of bitmap could have instead been constructed that provides definitive answers for all types of queries. In particular, where the number of different values that a record can have for a given field is relatively small, then such a bitmap may have a bit for each value, which can easily be constructed without undue or exorbitant memory utilization.

Therefore, if it is determined that the segment records are to be loaded into volatile memory and searched against the query in part 218, then in response the segment is loaded into volatile memory and the query is evaluated against the segment records (220). As noted in the previous section of the detailed description, the segment is loaded into volatile memory from the non-volatile storage or computer-readable medium, so that the segment records are more quickly searched, in the typical scenario in which volatile memory is quicker to access than non-volatile storage. Loading the segment into such memory thus loads all the segment records into the memory, such that at any given time (i.e., simultaneously), all the segment records are stored within the volatile memory.

The segment can then be searched for segment records that satisfy the query. In this respect, the segment records are said to be loaded into memory to at least partially locate the records of the database that satisfy the query, in that the records of the particular segment in question that satisfy the query may be located. As to the first and third example queries noted above, part 220 is performed, because it has been determined in part 218 that the segment records are to be loaded into memory and searched (i.e., evaluated) against the query. However, as to the second example query noted above, part 220 is not performed, because it has been determined in part 218 that the segment records are not to be loaded into memory and searched (i.e., evaluated) against the query.

By comparison, then, if it is determined that the segment records are not to be loaded into volatile memory and searched against the query in part 218, then in response, the segment in question is skipped (222), such that the segment and the segment records are not loaded into volatile memory and are not searched. As to the first and third example queries noted above, part 222 is not performed, because it has been determined in part 218 that the segment records are to be loaded into memory and searched against the query. However, as to the second example query noted above, part 222 is performed, because it has been determined in part 218 that the segment records are not to be loaded into memory and searched against the query.

As with part 126 of the method 100, part 222 of the method 200 also effects quicker searching of a database against a query. This is again because all the segment records of a given segment may be able to be discounted as not having any segment records that satisfy the query, without having to load the segment into memory, and without having to examine any of the segment records to determine whether they satisfy the query. For example, if there are ten segments, and nine of the ten segments do not have to be searched for segment records that satisfy a query, evaluation of the query may be considered in some respects as occurring 90% faster than if all ten segments have to be searched.

Index for a Segment

This section of the detailed description describes how an index for just the segment records of a segment of a database can be used. Such an index for a segment indexes just the segment records of the segment, and no other records of the database. In this respect, the index in this section of the detailed description is different than typical database indices, which index all the records within a database, and thus the records within all the segments of the database. An index is generally a data structure that improves the speed of search operations on a database, and particularly on a segment of a database.

FIG. 3 shows a method 300 for using an index for a segment of a database, according to an embodiment of the disclosure. An index for a segment is determined, or constructed (302). The index for the segment records of the segment can be constructed in a manner similar to how an index for all the records of a database is typically constructed, except that the records that are index are just the segment records, and not all the records of the database. The index may be determined (or updated) in part 302 at the time that new records are being loaded into the database in new or existing database segments, in one embodiment.

The index for the segment is stored (304). In one embodiment, the index is stored on a non-volatile storage, or computer-readable medium, with the segment itself. That is, the index is stored on the non-volatile storage as part of the segment itself, with the segment records of the segment. The underlying principle here is that the index for the segment is not used until it has been determined that the segment records of the segment are to be loaded into volatile memory that is quicker to access than such non-volatile storage, and searched. Therefore, at the time the segment is loaded into such volatile memory, the index for the segment is loaded into this memory with the segment records. Locating the index with the segment is thus advantageously convenient, because apart from searching the segment records of the segment, the index for the segment is not likely to be needed.

The index for the segment is then used (306). In particular, a query requesting one or more selected records of the database to be located is received (308). The query may request records with a given field that have a specified range (or multiple ranges) or that are equal to a specified value. It is determined whether or not to load the segment records of the segment into volatile memory and search these records against the query (310). Part 310 may be performed by using lowest and highest values for the segment records, as described above in relation to part 122 of the method 100, and/or by using a bitmap for the segment, as described above in relation to part 218 of the method 200.

In response to determining that the segment records of the segment are to be loaded into the volatile memory and searched against the query (312), the following is performed. First, the segment is loaded from the non-volatile storage or computer-readable medium into volatile memory (314). Loading of the segment in this case includes loading both the segment records of the segment into volatile memory, as well as loading the index for the segment into volatile memory. Because the index is stored with the segment records on the non-volatile storage, loading the index into volatile memory along with the segment records does not exact much, if any, of a performance penalty.

Second, the segment records are searched to locate any such records that satisfy the query (316), specifically by using the index. By using the index, the segment records themselves do not have to be examined or searched individually. Rather, the index instead provides references to the segment records. As such, searching for segment records that satisfy the query is achieved more quickly. Rather than examining each individual segment record to locate the segment records that satisfy the query, the query just has to be examined against the index, and just the segment records that satisfy the query retrieved. Such improved searching performance is achieved at little or no performance penalty in loading the segment into volatile memory, as noted in the previous paragraph.

By comparison, as has been described above in relation to parts 126 and 222 of the methods 100 and 200, respectively, if it is determined that the segment records are not to be loaded into volatile memory and searched against the query in part 310, then in response, the segment in question is skipped (222). As such, the segment and the segment records are not loaded into volatile memory and are not searched. Because the segment records do not have be searched, this also means that the index for the segment does not have to be loaded into volatile memory.

Representative Computing System

In conclusion, FIG. 4 shows a representative computing system 400, according to an embodiment of the present disclosure. The computing system 400 may be implemented as one or more computing devices. In the case where the computing system 400 is implemented over more than one computing device, the individual computing devices may communicate with one another over a network.

The computing system 400 includes hardware, such as one or more processors 402, non-volatile storage 404, volatile memory 406, and one or more computer-readable media 408. The computing system 400 typically includes other hardware, in addition to the processors 402, the storage 404, the memory 406, and the media 408. Such other hardware may include network adapters, graphics hardware, input devices, output devices, and so on.

The non-volatile storage 404 is non-volatile in that when power is removed from the computing system 400, the storage 404 retains its contents. By comparison, the volatile memory 406 is volatile in that when power is removed from the computing system 400, the memory 406 loses its contents. The volatile memory 406 is more quickly accessed than the non-volatile storage 404 is. The non-volatile storage 404 may include a hard disk drive or non-volatile semiconductor memory like flash memory, for instance. By comparison, the volatile memory 406 may include volatile semiconductor memory like dynamic random access memory.

The non-volatile storage 404 stores a database 410, which includes a representative database segment 412. The segment 412 includes a number of records 414, but not all the database records of the database 410. The records 414 are specifically referred to as segment records. The segment 412 also includes an index 416. The index 416 relates to just the segment records 414 of the segment 412, and not to all the database records of the database 410. The index 416 is stored with the segment records 414 as part of the segment 412.

The non-volatile storage 404 also stores lowest and highest values 418 of the segment records 414, as well as a bitmap 420 for the segment 412. The lowest and highest values 418 and the bitmap 420 may be loaded into the volatile memory 406 at the time the database 410 is initialized for access. By comparison, the segment 412 may be loaded into the volatile memory 406 just at the time the segment 412 is to be searched for records that satisfy a received query.

The database records of the database 410 are organized over a number of segments that the segment 412 exemplarily represents. Each database record is assigned to just one of these segments, and no database record remains unassigned in one embodiment. The entire database 410 may not be able to be loaded into the volatile memory 406, in that not all of the records of the database 410 are able to be loaded into the memory 406 at the same time (i.e., simultaneously). Rather, just the segment records of a limited number of segments— including as few as one segment in one embodiment—may be loaded into the volatile memory 406 at the same time.

The computer-readable media 408 may be the same computer-readable media as the non-volatile storage 404 and/or the volatile memory 406, or it may be another type of computer-readable media. The computer-readable media 408 store one or more computer programs 422. In general, as parts of the computer programs 422 are to be executed by the processors 402, they are moved from the non-volatile storage 404 to the volatile memory 406. However, the entirety of the computer programs 422 may be able to be moved from the non-volatile storage 404 to the volatile memory 406 in one embodiment, if there is sufficient volatile memory 406.

The computer programs 422 are executed by the processors 402 to perform any of the methods 100, 200, and/or 300 that have been described. As such, execution of the computer programs 422 is said to load the segment records of a segment from the non-volatile storage 404 into the volatile memory 406, such that all the segment records in question are simultaneously located within the memory 406, to search the segment records against a received query. A given segment is loaded in this way responsive to one or more of two different conditions being satisfied.

The first condition is that the query encompasses the lowest values and/or the highest values of the segment records of the segment, such as the lowest and highest values 418 of the segment records 414 of the segment 412. That is, the first condition is that part 122 of the method 100 has indicated that at least one of the segment records does, or may, satisfy the query. The second condition is that one or more given values encompassed by the query has a corresponding selected bit within the bitmap for the segment that is equal to one, such as the bitmap 420 for the segment 412. That is, the second condition is that part 218 of the method 200 has indicated that at least one of the segment records does, or may, satisfy the query.

Execution of the computer programs 422 is finally said to also search the segment records against the query, after loading the segment records into the volatile memory 406, by using an index for the segment, such as the index 416 for the segment 412. As noted above, an index for a segment relates to just the segment records of the segment. That is, an index for a segment does not relate to any database records other than the records encompassed by the segment itself.

I claim:

1. A method comprising:
   receiving a segment of a database stored on a non-transitory computer-readable medium, the segment encompassing a plurality of records of the database less than a total number of records of the database the plurality of records are referred to as segment records, where one or more of the segment records have values for a field of the database;
   determining and storing a plurality of lowest values of the segment records for the field and a plurality of highest values of the segment records for the field;
   determining and storing a bitmap for the segment, one or more selected bits of the bitmap each corresponding to a different value for the field, each selected bit set to one where one or more of the segment records have the value to which the selected bit corresponds and set to zero where none of the segment records have the value to which the selected bit corresponds;
   determining and storing an index for the segment, the index relating to only the segment records and not to the records of the database other than the segment records;
   loading the segment into memory from the non-transitory computer-readable medium to locate one or more selected records of the database that satisfy a query, wherein the lowest values and the highest values, and the bitmap, each separately permits determination of whether the segment is loaded, without having to use the index to make a determination, wherein where the one or more selected bits of the bitmap that each correspond to a different value for the field are set, one or more of the segment records definitively include the different value for the field; and
   searching, using the index, the segment records after the segment is loaded into the memory, to at least partially locate the selected records that satisfy the query.

2. The method of claim 1, wherein determining and storing the lowest values of the segment records for the field and the highest values of the segment records for the field comprises storing the lowest values and the highest values on the non-transitory computer-readable medium apart from where the segment of the database is stored on the non-transitory computer-readable medium.

3. The method of claim 1, further comprising, after determining and storing the lowest values of the segment records for the field and the highest values of the segment records for the field:
   receiving the query requesting one or more selected records of the database be located;
   determining whether to search the segment records against the query by comparing the query against the lowest values of the segment records for the field and against the highest values of the segment records for the field;
   in response to determining that the segment records are to be searched against the query,
      loading the segment, including all the segment records, from the non-transitory computer-readable medium into the memory, such that all the segment records of the segment are simultaneously located within the memory, the memory being faster to access than the non-transitory computer-readable medium is, to search the segment records against the query to at least partially locate the selected records that satisfy the query; and,
   in response to determining that the segment records are not to be searched against the query,
      skipping the segment, such that none of the segment records are loaded into the memory and such that the segment records are not searched to locate the selected records that satisfy the query.

4. The method of claim 1, wherein determining and storing the bitmap for the segment comprises storing the bitmap on the non-transitory computer-readable medium apart from where the segment of the database is stored on the non-transitory computer-readable medium.

5. The method of claim 1, further comprising, after determining and storing the bitmap for the segment:
   receiving the query requesting one or more selected records of the database that satisfy one or more given values for the field of the database;
   determining whether to search the segment records against the query by determining whether any of the given values has a corresponding selected bit within the bitmap equal to one;
   in response to determining that any of the given values has a corresponding selected bit within the bitmap equal to one,
      loading the segment, including all the segment records, from the non-transitory computer-readable medium into the memory, such that the segment records of the segment are simultaneously located within the memory, the memory being faster to access than the non-transitory computer-readable medium is, to search the segment records against the query to at least partially locate the selected records that satisfy the query; and, in response to determining that none of the given values has a corresponding selected bit within the bitmap equal to one,
skipping the segment, such that none of the segment records are loaded into the memory and such that the segment records are not searched to locate the selected records that satisfy the query.

6. The method of claim 1, wherein the selected bits of the bitmap are first selected bits, and a second selected bit of the bitmap corresponds to a range of values for the field, the second selected bit set to one where one or more of the segment records have a value falling within the range of values and set to zero where none of the segment records have a value falling within the range of values.

7. The method of claim 1, wherein determining and storing the index for the segment comprises storing the index as part of the segment, such that the index is stored on the computer-readable medium with the segment of the database.

8. The method of claim 1, further comprising, after determining and storing the index for the segment,
receiving a query requesting one or more selected records of the database be located;
determining whether to search the segment records against the query;
in response to determining that the segment records are to be searched against the query,
loading the segment, including all the segment records, from the non-transitory computer-readable medium into memory, such that the segment records of the segment are simultaneously located within the memory, the memory being faster to access than the computer-readable medium is; and
searching the segment records, as loaded within the memory, against the query by using the index for the segment, to at least partially locate the selected records that satisfy the query.

9. The method of claim 8, wherein determining whether to search the segment records against the query comprises one or more of:
comparing the query against the lowest values of the segment records for the field and the highest values of the segment records for the field to determine whether to search the segment records against the query;
using the bitmap in relation to the query to determine whether to search the segment records against the query.

10. A non-transitory computer-readable medium having a computer program stored thereon, where execution of the computer programs by a processor of a computing device causes a method to be performed, the method comprising:
receiving a query requesting one or more selected records of a total number of records of a database stored on non-volatile storage, the database including a segment encompassing a plurality of records of the database less than the total number of records of the database and that are referred to as segment records, where one or more of the segment records have values for a field of the database;
determining whether to search the segment records against the query by:
determining whether the query encompasses any of a plurality of lowest values of the segment records for the field or any of a plurality of highest values of the segment records for the field,
determining whether any of one or more given values encompassed by the query has a corresponding selected bit within a bitmap, the bitmap including one or more selected bits that each correspond to a different value for the field, each selected bit set to one where one or more of the segment records have the value to which the selected bit corresponds and set to zero where none of the segment records have the value to which the selected bit corresponds, wherein where the one or more selected bits of the bitmap that each correspond to a different value for the field are set, one or more of the segment records definitively include the different value for the field;
wherein, the lowest values and the highest values and the bitmap separately permits determination whether to search the segment records against the query;
in response to determining that the segment records are to be searched against the query,
loading the segment, including all the segment records, from the non-volatile storage into memory, such that all the segment records of the segment are simultaneously located within the memory, the memory being faster to access than the non-volatile storage is; and,
after loading the segment into the memory, searching the segment records, as loaded into the memory, against the query by using the index for the segment, to at least partially locate the selected records that satisfy the query, where the index relates to just the segment records and not to the records of the database other than the segment records;
in response to determining that the segment records are not to be searched against the query,
skipping the segment, such that none of the segment records are loaded into the memory and such that segment records are not searched to locate the selected records that satisfy the query,
wherein where the one or more selected bits of the bitmap that each correspond to a different value for the field are set, one or more of the segment records definitively include the different value for the field.

11. The non-transitory computer-readable medium of claim 10, wherein the lowest values, the highest values, and the bitmap are stored within the segment records as part of the segment.

12. A system comprising:
a processor;
a non-volatile storage storing a database, the database including a segment, the segment encompassing a plurality of records of the database less than a total number of records of the database and that are referred to as segment records;
memory that is accessible faster than the non-volatile storage is;
a non-transitory computer-readable medium storing a computer program, the computer program executed by the processor to load the segment records from the non-volatile storage into the memory, such that all the segment records of the segment are simultaneously located within the memory, to search the segment records against the query;
a first condition being that the query encompasses any of a plurality of lowest values of the segment records for the field or any of a plurality of highest values of the segment records for the field;
a second condition being that any of one or more given values encompassed by the query has a corresponding selected bit within a bitmap that is equal to one, the bitmap including one or more selected bits that each correspond to a different value for the field, each selected bit set to one where one or more of the segment records have the value to which the selected bit corresponds and set to zero where none of the segment records have the value to which the selected bit corresponds;

wherein the computer program executed by the processor loads the segment records from the non-volatile storage into the memory responsive to both of the first condition and the second condition being satisfied, without using an index for the segment of the segment records, wherein the second condition where the one or more selected bits of the bitmap that each corresponding to a different value for the field are set, one or more of the segment records definitively include the different value for the field;

wherein the computer program is further executed by the processor to, after loading the segment records into the memory, search the segment records against the query by using the index for the segment, to at least partially locate the selected records that satisfy the query, the index relating to just the segment records and not to the records of the database other than the segment records.

13. The system of claim 12, wherein the lowest values, the highest values, and the bitmap are stored within the segment records as part of the segment.

* * * * *

UNITED STATES PATENT AND TRADEMARK OFFICE
CERTIFICATE OF CORRECTION

PATENT NO. : 8,108,400 B2  
APPLICATION NO. : 12/493189  
DATED : January 31, 2012  
INVENTOR(S) : Goetz Graefe Page 1 of 1

It is certified that error appears in the above-identified patent and that said Letters Patent is hereby corrected as shown below:

In the Claims:

In column 11, line 43, in Claim 1, after "database" insert -- and --.

In column 11, line 66, in Claim 1, delete "make a" and insert -- make the --, therefor.

In column 14, line 11, in Claim 10, after "permits" insert -- the --.

In column 14, lines 33-37, in Claim 10, delete "query, wherein where the one or more selected bits of the bitmap that each correspond to a different value for the field are set, one or more of the segment records definitively include the different value for the field." and insert -- query. --, therefor.

Signed and Sealed this  
Thirtieth Day of April, 2013

Teresa Stanek Rea  
*Acting Director of the United States Patent and Trademark Office*